United States Patent

Chin et al.

[11] Patent Number: 5,362,867
[45] Date of Patent: Nov. 8, 1994

[54] METHOD OF MAKING CELLULOSE YARN SOLUTION

[75] Inventors: Hui-Ching Chin; Yuan-Tsung Chen; Guo-Jane Cheng, all of Chung-Hua, Taiwan, Prov. of China

[73] Assignee: Formosa Chemicals & Fibre Corporation, Chung Hua, Taiwan, Prov. of China

[21] Appl. No.: 142,923

[22] Filed: Oct. 29, 1993

Related U.S. Application Data

[63] Continuation of Ser. No. 888,633, May 27, 1992, abandoned.

[51] Int. Cl.$^5$ .......................... C08B 9/02; C08L 1/24; C09J 101/24
[52] U.S. Cl. .................................. 536/57; 106/165; 106/168
[58] Field of Search .................. 536/31, 39, 57; 106/165, 168

[56] References Cited

U.S. PATENT DOCUMENTS

| | | | |
|---|---|---|---|
| 4,256,613 | 3/1981 | Franks et al. | 536/56 |
| 4,416,698 | 11/1983 | McCorsley, III | 106/163 R |
| 5,068,321 | 11/1991 | Buysch et al. | 536/32 |

*Primary Examiner*—Nathan M. Nutter
*Attorney, Agent, or Firm*—Bacon & Thomas

[57] ABSTRACT

An improved method of making cellulose yarn solution made up of solvents such as N-methylmorpholine-N-oxide and recovered caprolactam involves cutting a wood pulp sheet into small pieces, which are subsequently added into a kneading machine having therein water solution containing 63-67% of N-methylmorpholine-N-oxide and recovered caprolactam. The kneading machine is subjected to a three-stage heat treatment to produce the cellulose yarn solution at low cost and best qualities.

13 Claims, No Drawings

METHOD OF MAKING CELLULOSE YARN SOLUTION

BACKGROUND OF THE INVENTION

This application is a continuation-in-part application of U.S. patent application Ser. No. 07/888,633, filed May 27, 1992, and now abandoned.

The invention relates to a method of making yarn solution comprising N-methyl -morpholine-N-oxide and recovered caprolactam (c. p. l.) which is capable of dissolving wood pulp fiber. The organic compounds which are commonly used as solvents to dissolve wood pulp are as follows:

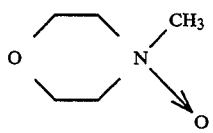
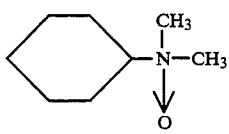

NMMO
N-Methylmorpholine-N-oxide

DMCAO
N,N-dimethylcyclohexylamine-N-oxide

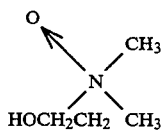
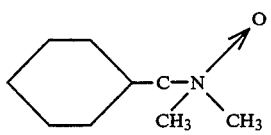

DMEAO
N'N-dimethyl-ethanolamine N-oxide

DMBAO
N'N-dimethylbenzylamine N-oxide

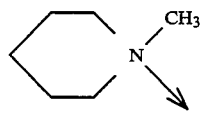
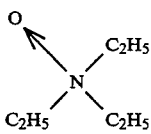

NMHPO
N-methyl-homopiperidine N-oxide

TEAO
N'N'N-triethylamine N-oxide

Among the six known organic solvents listed above, N-methyl-morpholine-N-oxide has proved to be an excellent solvent for use in dissolving wood pulp. In this regard, U.S. Pat. No. 4,416,698 to McCorsley, III, discloses a solution containing cellulose dissolved in a tertiary amine N-oxide solvent and a non-solvent for cellulose such as water. However, while MCorsley, III, discloses the use of NMMO, it does not disclose or suggest the use of CPL as an additional solvent. Moreover, NMMO is a rather expensive chemical product and is therefore not cost effective.

SUMMARY OF THE INVENTION

The primary objective of the present invention is to provide a cellulose yarn solution made up of NMMO and derivatives of caprolactam. The solution so made is an excellent dissolvent having a relatively low cost and having a low kinematic viscosity so as to improve the regenerated fiber.

In keeping with the principles of the present invention, the foregoing objective of the present invention is accomplished by a method of making cellulosic yarn solution comprising NMMO and derivatives of CPL recovered from the manufacturing process of nylon as solvents. NMMO and derivatives of CPL are combined in predetermined proportions so that the cellulose yarn solution so made is an excellent dissolvent for use in dissolving the wood pulp and is relatively inexpensive as compared with the cellulose yarn solution made of only NMMO.

DETAILED DESCRIPTION OF THE PREFERRED EMBODIMENT

The present invention concerns a method of making yarn solution comprising two solvents which are N-methylmorpholine-N-oxide and recovered caprolactam which are capable of dissolving wood pulp fiber. The yarn solution of the present invention is totally different from the prior art yarn solution made up of only NMMO as the solvent. In the yarn solution of the present invention, the content of the solid fiber can reach as high as 15 %, which is much higher than the percentage of solid fiber content obtained in conventional processes.

Thus, the solution of the present invention has excellent solubility which results in increased solid fiber content and improved production.

In the method of the present invention, the recovered caprolactam is the residual fiber waste from the production of nylon for example by Formosa Chemicals & Fiber Corporation and which is depolymerized in the presence of phosphoric acid as catalyst. The derivatives of CPL are used as solvents because they are capable of dissolving topically and they expand and lubricate the fibers.

The nylon waste is treated at high temperature in the presence of phosphoric acid as catalyst so as to yield CPL which contains in quantity six CPL derivatives as listed below:

| Derivatives | Contents (%) | |
| --- | --- | --- |
| 6-methyl valerolactam | 19.3% | 38.6% |
| 7-methyl lactam | 2.5% | 4.99% |
| 1-methyl lactam | 0.46% | 0.9% |
| 5-Ethyl butyrolacetone | 1.2% | 2.4% |
| O:-ethylene glycol | 0.56% | 1.01% |
| 3-methyl lactam | 0.9% | 1.7% |

These derivatives of caprolactam are capable of partially dissolving and expanding and moistening the cellulose. In addition, the use of the CPL derivatives have the advantage of being more economical as well as more capable of dissolving the cellulose fiber in conjunction with the NMMO.

The caprolactam and NMMO are mixed in proportions which have been found to effectively dissolve wood pulp fiber. The resulting process is inexpensive and very effective in dissolving the fiber. The mixture has excellent solubility and is capable of lowering the kinematic viscosity of the yarn solution during the manufacturing process of the yarn. In other words, the presently claimed mixture is more effective than prior solutions containing only pure NMMO as the solvent both in transporting and producing the yarn. In addition, the mixture of the present invention makes it possible to increase the velocity of the thread spinning up to 800–1000 M/min, over dinier 1.0–3.0 (spinning velocity depends on dinier value). Moreover, the solution of the present invention improves the quality of the regenerative fiber.

Before using the cellulose yarn solution of the present invention, an anti-oxidation agent, such as magnesium sulfate, must be added in proportions ranging from 0.1% to 0.2% (by weight) so as to ensure that the degree of polymerization of the fiber is kept in a range of 500–700. This step results in the production of fiber having excellent strength.

In addition, prior to mixing with the CPL derivative composition, a 50% NMMO solution is treated by conventional techniques (such as distillation) in order to increase the concentration of NMMO to 63–67% (by volume). In operation, a wood pulp sheet which contains, for example, 92% cellulose (by weight) and has a degree of polymerization of 900–1100 and density of 120–150 g/l is comminuted by conventional methods. The wood pulp sheet may be cut into small pieces or particles, such as fibers, or ground in a mill through a screen having a preselected mesh. The screen mesh and particles size are selected keeping in mind that the smaller the particles, the more rapid the dissolution of the cellulose.

The communated wood pulp cellulose, cut pieces, fibers, or ground particles are then added into a kneading machine having therein a water solution comprising 63–67 volume % of NMMO and the recovered derivatives of CPL. A three-stage heat treatment is then applied to the mixture as follows.

In the first step, temperatures of 80°–90° C. are applied to the solution in order to evaporate excess water. During this step, the material is transported through the kneading machine without dissolving the cellulose fiber. The first step lasts approximately 5 minutes. In the second step, the temperature is raised to approximately 100° C., during which the degree of polymerization of the wood pulp is effectively lowered. The second step lasts approximately 30 minutes. In the third step, the temperature is raised to approximately 120° C., during which step wood pulp fiber is dissolved. The third step lasts approximately 1 5 minutes. The entire three-stage heating process takes approximately 50 minutes. In the conventional methods using only NMMO as the solvent, the time required may be as high as 6–8 hours.

Thus, by applying such step-by-step heating and dissolving, the solubility of the solute is greatly enhanced in a shortened period of time and the quality of the yarn solution is preserved. This is in contrast to methods wherein high temperature of evaporation is used immediately which results in low or insufficient water content of the solution, which in turn results in poorly dissolved wood pulp fiber or cellulose.

Thus, according to the present invention, an improved method of making a cellulose yarn solution comprises a solvent made up of NMMO and CPL derivatives, in contrast to conventional methods in which the solvent consists only of NMMO. The following table 1 shows a comparison of the operational conditions in a method using only NMMO and in the method of the present invention which uses NMMO and CPL derivatives as solvents.

TABLE 1

| Comparison of Operational Requirements | | | | |
| --- | --- | --- | --- | --- |
| Solvent | Wood pulp degree of polymerization | Degree of vacuum mmhg | Temperature | time required |
| NMMO | 700–1000 | −600~ −750 | 90° C.–95° C. | 6–8 hours |
| NMMO + CPL | 900–1100 | −740~ −750 | 80–90° C. (~5 min.) 100° C. (~30 min.) 120° C. (~15 min.) | ~50 min. |

TABLE 2

| Comparison of the yarn solutions in terms of concentration in percentage by weight and of the quality | | | | | |
| --- | --- | --- | --- | --- | --- |
| | Concentrations in percentage by weight | | | | Quality |
| Solvent | Cellulose | Water | NMMO | CPL | Viscosity |
| NMMO | 8–10% | 11–13% | 77–79% | none | 800–1500 poise |
| NMMO + CPL | 8–13% | 8–13% | 37–42% | 37–42% | 800–1000 poise |

In addition, the following table 3 shows a quality comparison of the resulting rayon fibers of the present invention as compared to the rayon fibers produced by the conventional method using only NMMO as solvent.

TABLE 3

| Quality comparison of rayon fibers produced by the present method and the prior art method: | | |
| --- | --- | --- |
| | NMMO + CPL | NMMO |
| Condition | | |
| Concentration of cellulose in yarn solution % | 15% | 8% |
| Diameter of weaving mouth | 150 μm | 150 μm |
| Number of | 68 | 18 |

TABLE 3-continued

Quality comparison of rayon fibers produced by the present method and the prior art method:

| | NMMO + CPL | NMMO |
|---|---|---|
| weaving mouth Weaving speed M/min | 500–800 | 6.3 |
| Poise | 1000 | 1250 |
| Physical Properties | | |
| (Den) | 1.5 | 1.5 |
| Tenacity (cN/tex) | (42.4–47.7) | (33–36.5) |
| Elongation at break % | 10–14 | 7–8 |
| Heat shrinkage rate | under 1% | 2% |

On the basis of the above comparisons between the method of the present invention and those methods wherein NMMO only is used as the solvent, it is apparent that the cellulose yarn solution of the present invention is superior to those solutions previously used in terms of fiber quality, physical properties, productivity and production efficiency.

We claim:

1. In a method of making cellulose yarn solution from wood pulp and a solvent including aqueous N-methyl-morpholine-N-oxide in a kneading apparatus including a three stage heating step, wherein the improvement comprises including an effective amount of caprolactam derivatives recovered from manufacturing nylon and capable of dissolving the wood pulp as a solvent.

2. The method of claim 1 wherein the recovered caprolactam derivatives are obtained from nylon waste treated at a high temperature in the presence of a phosphoric acid catalysts.

3. The method of claim 1 wherein sufficient quantities of the starting materials are included so that the cellulose yarn solution obtained comprises 8–13 weight % cellulose, 8–13 weight % water, 47–52 weight % N-methylmorpholine-N-oxide and 32–37 weight % of recovered caprolactam derivatives.

4. The method of claim 1 wherein the recovered caprolactam derivatives comprise I 9.3–38.6 weight % of 6-methyl valerolactam, 2.5–4.99 weight % of 7-methyl lactam, 0.46–0.9 weight % of 1-methyl lactam, 1.2–2.4 weight % of 5-ethyl butyrolacetone, 0.56–1.01 weight % of 0:-ethylene glycol, and 0.9–1.7 weight % of 3-methyl lactam.

5. The method of claim 1, wherein the N-methylmorpholine-N-oxide is present at 63–67 weight %.

6. The method of claim 4, wherein the N-methylmorpholine-N-oxide is present at 63–67 weight %.

7. The method of claim 3 wherein the recovered caprolactam derivatives are obtained from nylon waste treated at a high temperature in the presence of a phosphoric acid catalysts.

8. The method of claim 7, wherein the N-methylmorpholine-N-oxide is present at 63–67 weight %.

9. The product produced by the method of claim 1.

10. The product produced by the method of claim 4.

11. The product produced by the method of claim 6.

12. The product produced by the method of claim 7.

13. The product produced by the method of claim 8.

* * * * *

UNITED STATES PATENT AND TRADEMARK OFFICE
CERTIFICATE OF CORRECTION

PATENT NO. : 5,362,867
DATED : November 8, 1994
INVENTOR(S) : Chiu et al

It is certified that error appears in the above-indentified patent and that said Letters Patent is hereby corrected as shown below:

On the title page:

Item [73], please change "Prov." to --Rep.--

Item [63], change "Continuation" to --Continuation-in-part--.

COLUMN 1:

The formula representing NMHPO should read as follows:

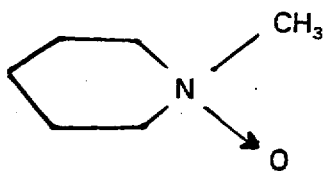

UNITED STATES PATENT AND TRADEMARK OFFICE
CERTIFICATE OF CORRECTION

PATENT NO. : 5,362,867
DATED : November 8, 1994
INVENTOR(S) : Chiu et al

It is certified that error appears in the above-indentified patent and that said Letters Patent is hereby corrected as shown below:

COLUMN 4:

Line 6, "1 5" should read --15--.

COLUMN 6:

Line 10, "1 9.3-38.6" should read --19.3-38.6--.

Signed and Sealed this

Fourth Day of July, 1995

Attest:

BRUCE LEHMAN

Attesting Officer

Commissioner of Patents and Trademarks

UNITED STATES PATENT AND TRADEMARK OFFICE
CERTIFICATE OF CORRECTION

PATENT NO. : 5,362,867
DATED : November 8, 1994
INVENTOR(S) : Chiu et al

It is certified that error appears in the above-indentified patent and that said Letters Patent is hereby corrected as shown below:

On the title page, item [75] inventor's last name shoud read —Chiu— and "Prov. of China" should read —Rep. of China—.

Signed and Sealed this

Seventeenth Day of October, 1995

Attest:

BRUCE LEHMAN

Attesting Officer    Commissioner of Patents and Trademarks